United States Patent
Holst et al.

(10) Patent No.: US 11,300,237 B2
(45) Date of Patent: Apr. 12, 2022

(54) UNBONDED FLEXIBLE PIPE AND AN END-FITTING

(71) Applicant: National Oilwell Vareo Denmark I/S, Brondby (DK)

(72) Inventors: Thorsten Holst, Taastrup (DK); Tom Larsen, Roskilde (DK); Anders Straarup, Frederiksberg (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 261 days.

(21) Appl. No.: 16/485,905

(22) PCT Filed: Feb. 19, 2018

(86) PCT No.: PCT/DK2018/050033
§ 371 (c)(1),
(2) Date: Aug. 14, 2019

(87) PCT Pub. No.: WO2018/149462
PCT Pub. Date: Aug. 23, 2018

(65) Prior Publication Data
US 2020/0011467 A1    Jan. 9, 2020

(30) Foreign Application Priority Data
Feb. 20, 2017 (DK) .......................... PA 2017 70120

(51) Int. Cl.
*F16L 53/37* (2018.01)
*F16L 11/08* (2006.01)
(Continued)

(52) U.S. Cl.
CPC ............. *F16L 53/37* (2018.01); *F16L 11/082* (2013.01); *F16L 33/01* (2013.01); *F16L 33/28* (2013.01)

(58) Field of Classification Search
CPC . F16L 53/34; F16L 53/32; F16L 53/37; F16L 33/01; F16L 33/28; F16L 11/083
See application file for complete search history.

(56) References Cited

U.S. PATENT DOCUMENTS 4,033,612 A * 7/1977 Chevalier ............. F16L 11/083
285/222.4
4,549,581 A * 10/1985 Unno .................... B29C 53/583
138/109
(Continued)

FOREIGN PATENT DOCUMENTS

WO    2012/092931 A1    7/2012
WO    2015014365 A1     2/2015
(Continued)

OTHER PUBLICATIONS

Danish Search Report for Application No. PA 2017 70120, dated Jul. 20, 2017.
(Continued)

*Primary Examiner* — Matthew Troutman
*Assistant Examiner* — Alexander T Rufrano
(74) *Attorney, Agent, or Firm* — Pearne & Gordon LLP

(57) ABSTRACT

An assembly comprising an end-fitting and an unbonded flexible pipe comprising several layers. The unbonded flexible pipe has an end-part entering the end-fitting at the front end and the layers of the unbonded flexible pipe being terminated in the end-fitting. The unbonded flexible pipe further comprises a first electrically conductive layer and a second electrically conductive layer, where the first electrically conductive layer is electrically insulated from the second electrically conductive layer. The end-fitting comprises a first electric zone electrically connected with the first electrically conductive layer, and a second electric zone electrically connected with the second electrically conductive layer, the first electric zone is electrically separated from
(Continued)

the second electric zone, and the end-fitting comprises a third electric zone, the third electric zone being electrically separated from first electric zone and the second electric zone.

15 Claims, 3 Drawing Sheets

(51) Int. Cl.
*F16L 33/01* (2006.01)
*F16L 33/28* (2006.01)

(56) References Cited

U.S. PATENT DOCUMENTS

| | | | |
|---|---|---|---|
| 9,523,446 | B2 | 12/2016 | Kassow et al. |
| 10,113,677 | B2 * | 10/2018 | Bourget ................... F16L 33/18 |
| 10,451,206 | B2 * | 10/2019 | Espinasse ............... F16L 33/01 |
| 2013/0340877 | A1 | 12/2013 | Kassow et al. |
| 2016/0178106 | A1 | 6/2016 | Glejbol |
| 2016/0290539 | A1 | 10/2016 | Nielsen |
| 2017/0159866 | A1 | 6/2017 | Glejbol |
| 2017/0299092 | A1 | 10/2017 | Larsen et al. |
| 2018/0231163 | A1 | 8/2018 | Holst et al. |

FOREIGN PATENT DOCUMENTS

| | | |
|---|---|---|
| WO | 2015/070871 A1 | 5/2015 |
| WO | 2016/000716 A1 | 1/2016 |
| WO | 2016/062319 A1 | 4/2016 |
| WO | 2016/170360 A1 | 10/2016 |
| WO | 2017/025096 A1 | 2/2017 |
| WO | 2017/140321 A1 | 8/2017 |

OTHER PUBLICATIONS

International Search Report for International Application No. PCT/DK2018/050033, dated Apr. 11, 2018.
Recommended Practice for Flexible Pipe, ANSI/API 17 B, Fourth Edition, Jul. 2008.
Specification for Unbonded Flexible Pipe, ANSI/API 17J, Third edition, Jul. 2008.
Supplementary European Search Report for EP18754619 dated Sep. 18, 2020.

* cited by examiner

UNBONDED FLEXIBLE PIPE AND AN END-FITTING

TECHNICAL FIELD

The present invention relates to an assembly of an unbonded flexible pipe and an end-fitting, where the flexible pipe comprises several layers and is suitable for offshore and subsea transportation of oil and gas.

BACKGROUND

Unbonded flexible pipes as well as end-fitting therefore and assemblies thereof are well-known in the art and are for example described in "Recommended Practice for Flexible Pipe", ANSI/API 17 B, fourth Edition, July 2008, and the standard "Specification for Unbonded Flexible Pipe", ANSI/API 17J, Third edition, July 2008.

Such pipes usually comprise an internal pressure sheath also often called an inner sealing sheath, an inner liner or an inner sheath, which forms a barrier against outflow of the fluid which is conveyed in the bore of the pipe, as well as one or more armoring layers. Often the pipe further comprises an outer protection layer which provides mechanical protection of the armor layers. The outer protection layer may be a sealing layer sealing against ingress of sea water. In certain unbonded flexible pipes, one or more intermediate layers are arranged between armor layers.

The armoring layers usually comprise or consist of one or more helically wound elongated armoring elements, where the individual armor layers are not bonded to each other directly or indirectly via other layers along the pipe.

When the armor layers are wound at an angle larger than 55° relative to the pipe center axis, they are classified as pressure armor layers, whereas armor layers wound with an angle of less than 55° are classified as tensile armor layers. By using un-bonded wound elements, the pipe becomes bendable and sufficiently flexible to roll up for transportation. Furthermore, the pipe becomes resilient to fatigue failure, which is a common failure mode for bonded pipes.

The unbonded flexible pipe may comprise a carcass which is an armor layer arranged on the inner side of the internal pressure sheath in the bore. The pipe may also comprise one or more pressure armors and/or one or more tensile armors arranged on the outer side of the internal pressure sheath.

In this text, the term "unbonded" means that at least two of the layers including the armoring layers and polymer layers are not bonded to each other. In practice, the known pipe normally comprises at least two armoring layers located outside the internal pressure sheath and optionally an armor structure, a carcass, located inside the internal pressure sheath.

The end-fitting must be able to withstand both the internal pressure of the pipe and to transfer the axial forces from the pipe into the attached structure via e.g. a bolted connection. This requires high strength from a component partly or fully made from steel or another metal. As a consequence, the end-fitting is very rigid relative to the flexible pipe.

When the pipe comprises one or more tensile armors, these armors are normally terminated in a fixation zone located in a fixation chamber in the end-fitting. The fixation chamber is normally formed between an inner casing and an outer casing of the end-fitting and when the end-fitting is terminating one or more tensile armors, the fixation chamber is filled with a resin, such as epoxy.

When a carcass is present in the bore of the pipe, the carcass is normally fixed or terminated in the end-fitting by means of a carcass ring. When the unbonded flexible pipe comprises a pressure armor, such a pressure armor is conveniently fixed in the end-fitting by clamping means.

Unbonded flexible pipes are often used e.g. as riser pipes in the production of oil. One of the difficulties in the production of oil is that the crude oil needs a certain temperature to maintain low viscosity. In order to avoid undesired cooling down of a fluid in an unbonded flexible pipe, it is well-known to provide the unbonded flexible pipe with one or more thermal insulation layers. The thermal insulation of subsea pipelines is a practice which in certain situations does not provide a sufficient protection against increased viscosity or formation of solidified substances in the fluid, such as in case of temporary production stop. As temporary production stops cannot be fully avoided, it is essential that the pipe system is designed to prevent blocking during a temporary production stop. Removal of a blocking in a pipe can be very difficult and costly, and in worst case it is not possible to remove the blocking and as a result the whole pipe must be replaced.

Recent development has tended towards using heated pipes, in particular electric heated pipes to avoid undesired cooling of the fluid transported in the pipe and subsequent blocking of the pipe. The electric power is normally provided to the pipe via an end-fitting and rather high currents fed at a high voltage are frequently used to heat the pipe. Under nominal operational conditions neither the high current nor the high voltage causes problems. However, if an electrical failure occurs in the system, unprotected surfaces on the pipe or end-fitting may unintentionally become electrically polarized, potentially resulting in unintended leak currents as well as hazardous situations near the pipe.

WO 2016/062319 discloses an assembly comprising an end-fitting and an unbonded flexible pipe. The end-fitting is adapted for connecting the unbonded flexible pipe to a connector. The end-fitting has a through-going opening with a centreline and a front end and a rear end, and the end-fitting further comprises means for establishing an electrical connection to an electrical heating system in the unbonded flexible pipe. Moreover, the end-fitting comprises at least one first metallic part having a first surface contacting a second surface of at least one second part in the end-fitting where the first surface of the first metallic part, at least in the vicinity of the through-going opening, comprises a coating having a high electrically resistivity. The means for establishing electric contact are insulated and not in electrical contact with the metallic parts of the end-fitting and the electric conductive layers in the unbonded flexible pipe are insulated from the metallic parts of the end-fitting. The disclosed end-fitting has good properties in respect of reducing galvanic corrosion.

DISCLOSURE OF THE INVENTION

An object of the present invention is to improve the safety for electrical heated unbonded flexible pipes.

The present invention relates to an assembly comprising an end-fitting with a first-end and a second-end and a through-going opening having a center axis between the first-end and the second-end, and an unbonded flexible pipe comprising several layers and having a center axis along its length, said center axis of the unbonded flexible pipe being substantially coinciding with the center axis of the end-fitting for the part of the unbonded flexible pipe arranged in the end-fitting. The unbonded flexible pipe has a first end-part entering the end-fitting at the first-end and the layers of the unbonded flexible pipe being terminated in the end-fitting between the first-end and the second-end. The unbonded flexible pipe further comprises a first electrically conductive layer and a second electrically conductive layer, where the first electrically conductive layer is electrically insulated from the second electrically conductive layer. The end-fitting comprises a first electric zone electrically connected with the first electrically conductive layer, and a second electric zone electrically connected with the second electrically conductive layer, the first electric zone is electrically separated from the second electric zone, wherein the end-fitting comprises a third electric zone, said third electric zone being electrically separated from first electric zone and the second electric zone.

The end-fitting comprises electrical conductive and non-conductive parts which are assembled to form the end-fitting. The end-fitting is assembled during the process of terminating the flexible pipe in the end-fitting.

The unbonded flexible pipe comprises several layers, which layers from the inside and outwards may be constituted by a carcass, an internal pressure sheath, one or more pressure armor layers, one or more tensile armor layers, and an outer sheath. The unbonded flexible pipe may comprise further layers such as intermediate sheaths, antifriction layers and insulating layers (thermal and/or electrical). Two or more of the layers are made from electrical conductive material such as steel. At least two of the layers are not bonded to each other. According to the present invention, a first end-part of the flexible pipe is terminated in the end-fitting and a second end of the pipe may be terminated in another end-fitting. In the following, the flexible pipe may be referred to as the "pipe".

The term "electric zone" is a part having a delimited volume in the end-fitting, wherein the electric resistance between two points in the zone is less than $1\Omega$ measured at a direct voltage of 5 V.

The term "electrically connected" means that the electric resistance between two parts is less than $10\Omega$ when measured at a direct voltage of 5 V.

The term "electrically separated" means that the electric resistance between two parts is more than $100\Omega$ when measured at a direct voltage of 5 V.

The term "electrically insulated" in this context means insulated with a material having an electrically resistivity of at least $10^6 \Omega \cdot m$.

The term "electrical conductor" in this context means a material with an electrical resistivity of less than $10^{-2} \Omega \cdot m$ As the unbonded flexible pipe is suitable for electric heating, it comprises electrically conductive layers, and in an embodiment the first electrically conductive layer and the second electrically conductive layer of the unbonded flexible pipe are arranged substantially concentrically in respect of the center axis.

The term "substantially" should herein be taken to mean that ordinary product variances and tolerances are comprised.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The end-fitting according to the invention comprises the first electric zone which is electrically connected with the first electrically conductive layer, e.g. the electrical contact is established by contact or electrical wire. The end-fitting also comprises the second electric zone which is electrically connected with the second electrically conductive layer, e.g. by contact or wire. In the end-fitting the first electric zone and the second electric zone are electrically insulated and separated from each other. The end-fitting also comprises the third electric zone, which electric zone is electrically insulated and separated from first electric zone and the second electric zone.

The end-fitting is intended for use with an unbonded flexible pipe with electric heating and to ensure electric contact to layers in the pipe. In an embodiment, the first electric zone and the second electric zone of the end-fitting are arranged substantially concentrically in respect of the center axis. Thus, electrically connection may be established in a simple manner.

In an embodiment which also allows electrically connection quite easily, the first electric zone and the second electric zone of the end-fitting are arranged along the length of the center axis.

In the assembly according to the invention, the end-fitting furthermore comprises a third electric zone. In an embodiment, the third electric zone is arranged closer to the second-end of the end-fitting than the first electric zone and the second electric zone. The third electric zone is preferably connected to ground to improve safety in the assembly.

The electric zones, i.e. the first, the second and the third zones, are electrically conductive, and preferably the parts of the end-fitting constituting the electric zones are made from metallic material, such as carbon steel, coated carbon steel or stainless steel. However, the electric zones may also comprise parts made from carbon reinforced composites and highly filled polymers. In an embodiment the end-fitting comprises three electric zones. Thus, the invention provides an embodiment where the end-fitting comprises only three electric zones.

To improve safety, an embodiment of the end-fitting comprises an outer cover surrounding and being substantially co-axial with at least a part of the first electric zone and/or the second electric zone, said outer cover being of non-conductive material. The non-conductive material may be a polymer material such as polyethylene, polypropylene, polyamide, polyurethane or a fibre reinforced plastic, preferably a glass/epoxy, a glass/polyester or a glass/vinylester compound or a ceramic such as $Al_2O_3$ or $Si_3N_4$.

As an alternative to the above embodiment, the invention also comprises an embodiment in which the end-fitting comprises an outer cover surrounding and being substantially co-axial with at least a part of the first electric zone and/or the second electric zone, said outer cover being of electrically conductive material and connected to ground. The conductive material may be metallic, such as steel.

In an embodiment of the assembly according to the invention, the end-fitting comprises an outer cover surrounding and being substantially co-axial with at least a part of the first electric zone and/or the second electric zone, where the outer cover is made from electrically conductive material and connected to the third electrical zone. Thus, the cover may be connected to ground via the third electric zone.

It is desirable to provide an electric insulating barrier between the outer cover and the first electric zone and the second electric zone to avoid that the outer cover is energized when current is run through the pipe. Thus, in an embodiment, a void is formed between the outer cover and at least a part of the first electric zone and/or the second electric zone, said void being filled with an electrically insulating material. The insulating material may be an electrically insulating polymer, a wax, a ceramic or an electrically insulating fluid, e.g. an insulating oil or gas such as $SF_6$.

In an embodiment, the unbonded flexible pipe from the inside and outwards comprises a carcass, an internal pressure sheath, at least one pressure armor, at least one tensile armor and optionally an outer sheath. In this embodiment, the outer sheath is an optional feature and the outer sheath will serve to protect the armor layers in the pipe. The outer sheath may be fluid-tight or permeable to fluids, depending on the nature of the armor layers in the pipe. The outer sheath may e.g. be made of polymer materials such a polyethylene(PE), crosslinked polyethylene (PEX), polyamide (PA), polyurethane (PU), polypropylene (PP) or mixtures thereof.

To improve the function and the properties of the pipe, the unbonded flexible pipe may further comprise one or more intermediate layers. The intermediate layers may e.g. serve as anti-wear layers or anti-slip layers. Such intermediate layers may preferably be made from polymer material such as e.g. polyethylene, crosslinked polyethylene, polyamide, polyaramide, polyurethane, polypropylene or polyvinylidene fluoride (PVDF). The intermediate layers may be extruded layers or in the form of wound tapes. The polymer material may be fibre reinforced, e.g. with mineral fibres, metal fibres or polymer fibres.

To improve the thermal properties of the pipe, the unbonded flexible pipe in an embodiment comprises at least one thermal insulating layer. The thermal insulating layer is preferably made from polymer material such as polymer or polymeric mixture is a homopolymer or a copolymer comprising at least one of the materials in the group comprising polyolefins, e.g. polyethylene or polypropylene (PP), such as stiff linear copolymer PP with a branched homopolymer PP; polyoxyethylenes (POE); cycloolefin copolymers (COC); polyamides (PA), e.g. polyamide-imide, polyamide-11 (PA-11), polyamide-12 (PA-12) or polyamide-6 (PA-6)); polyimide (PI); polyurethanes such as polyurethane-isocyanurate; polyureas; polyesters; polyacetals; polyethers such as polyether sulphone (PES); polyoxides; polysulfides, such as polyphenylene sulphide (PPS); thermoplastic elastomers, such as styrene block copolymers, such as poly(styrene-block-butadiene-block-styrene) (SBS) or their selectively hydrogenated versions SEBS and SEPS; termoplastic polyolefins (TPO) e.g. comprising SEBS and/or SEPS; polysulphones, e.g. polyarylsulphone (PAS); polyacrylates; polyethylene terephthalates (PET); polyether-ether-ketones (PEEK); polyvinyls; polyacrylonitrils (PAN); polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer e.g. one of the above mentioned polymers compounded with reinforcement, such as solid or hollow microspheres, e.g. made from glass, polymer or silica, and/or fibres, such as glass fibres, carbon fibres, aramide fibres, silica fibres such as basalt fibres, steel fibres, polyethylene fibres, polypropylene fibres, mineral fibres, and/or any combination thereof. As it is known to the skilled person, the resin may be added various strength enhancing filler materials, additives, activators, lubricants, plasticizers, complexing agents, processing aids, compatibilizing agents and the like.

In an embodiment, the first electrically conductive layer is a carcass. The carcass is in physical contact with the fluid to be heated and which is transported in the bore of the pipe. Thus, there can be established a good transfer of heat between the carcass and the fluid transported in the bore.

In an embodiment, the second electrically conductive layer is a pressure armor and the pressure armor and the carcass are electrically connected at the second end of the pipe. Thus, an electric circuit may be driven by an electric power source with one terminal connected to the carcass and another terminal connected to the pressure armor. Thereby, the carcass may serve as the primary source of heat in the bore of the pipe while the pressure armor functions as return path for current to the electric power source.

In an embodiment, the second electrically conductive layer is a tensile armor. The tensile armor may be connected with a first layer which may be a carcass or a pressure armor to form an electrical circuit with an electric power source.

In an embodiment, the insulation between the first electrically conductive layer and the second electrically conductive layer is constituted at least partly by the internal pressure sheath. When the first electrically conductive layer is the carcass and the second electrically conductive layer is the pressure armor or the tensile armor, the internal pressure sheath may serve as an electrically insulating layer between the electrically conductive layers. The internal pressure sheath is made from e.g. polyethylene, polyamide or polyvinylidene fluoride which are electrical insulating materials, and in this embodiment the requirement for further electrical insulation is reduced or eliminated.

In an embodiment, the first electrically conductive layer and the second electrically conductive layer are connected with a source for electric power. Preferably, the layers are connected to the source for electric power via the end-fitting and the first and the second electric zone.

The electric power source applies a voltage between the first electrically conductive layer and the second electrically conductive layer (and the first and the second electric zone) and to improve the safety, the invention provides an embodiment where the electric power supply is electrically floating, i.e. operating without a well-defined ground potential. The use of floating electric power supply will also serve to protect the electric equipment in case of sudden changes in voltage. Furthermore, the floating electric power supply allows the second end of the pipe to find a natural potential equilibrium with ambient environment.

Hence, during nominal operation, the potential distribution in the system is largely determined by the driving voltage and the potential equilibrium at the second end of the pipe. A problem which may occur in this system is that any unintended additional current path may shift the second end of the pipe away from equilibrium. This shift will be superimposed on the entire pipe and may in the worst case result in high and potentially damaging electrical potential on metallic parts which are only slightly polarized during normal operation.

To avoid damage due to unintended shifting potentials, the end-fitting which e.g. is bolted to a supporting structure is split into at least three separate electrical zones. These zones are the first electrical zone connected to the first electrical layer of the pipe, the second electrical zone connected to the second electrical layer of the pipe and a third electrical zone which is exposed to the supporting structure, e.g. through fastening bolts.

In an embodiment, the applied voltage is in the range 100 V to 10 kV, such as in the range 500 V to 5 kV. The relatively high voltage serves to ensure that sufficient current passes through the layers of the pipe hereby ensuring sufficient heating of the pipe.

DETAILED DESCRIPTION OF THE INVENTION

The invention will be explained more fully below with reference to the drawings in which:

The figures are schematic and simplified for clarity, and they show only details which are essential to the understanding of the invention, while other details are left out. The same reference numerals may be used for identical or corresponding parts.

FIG. 1 illustrates an unbonded flexible pipe 2 and an end-fitting 3.

Figure 1:
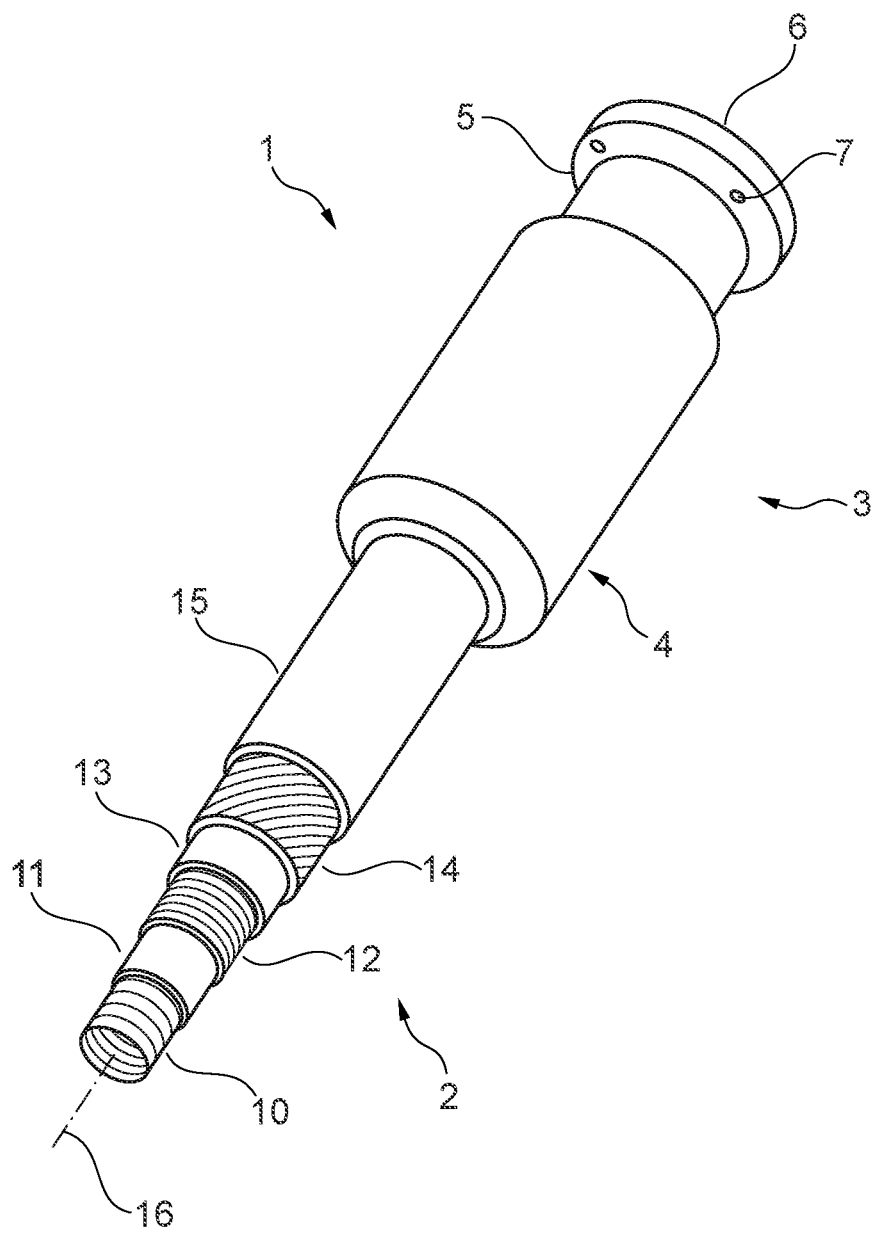
FIG. 1 shows an end-fitting and an unbonded flexible pipe.

The unbonded flexible pipe 2 comprises, from the inside an out, a carcass 10, an internal pressure sheath 11, a pressure armor 12, an intermediate electric insulating layer 13, a tensile armor 14 and an outer sheath 15.

The carcass 10 is made from elongate members of stainless steel wound with a winding angle of approximately 85 degrees in respect of the axis, indicated by line 16. The pressure armor 12 is made from an elongate member of carbon steel and wound around the internal pressure sheath 11 with a winding angle of approximately 80 degrees in respect of the axis 16.

The intermediate electric insulating layer 13 is an extruded polyethylene layer. The tensile armor 14 is also made from an elongate member of carbon steel and wound around the pressure armor with a winding angle of approximately 45 degrees in respect of the axis 16.

In this embodiment, the internal pressure sheath 11 and the outer sheath 15 are both substantially fluid tight. The internal pressure sheath 11 is made from extruded polyethylene and the outer sheath 15 is made from extruded polyamide.

The end-fitting 3 comprises a body part 4, a channel 5 and a flange 6 for connection to either a connector or another end-fitting. The flange 6 comprises holes 7 for bolts which may be used for the connection. The material of the end-fitting is carbon steel.

Figure 2:
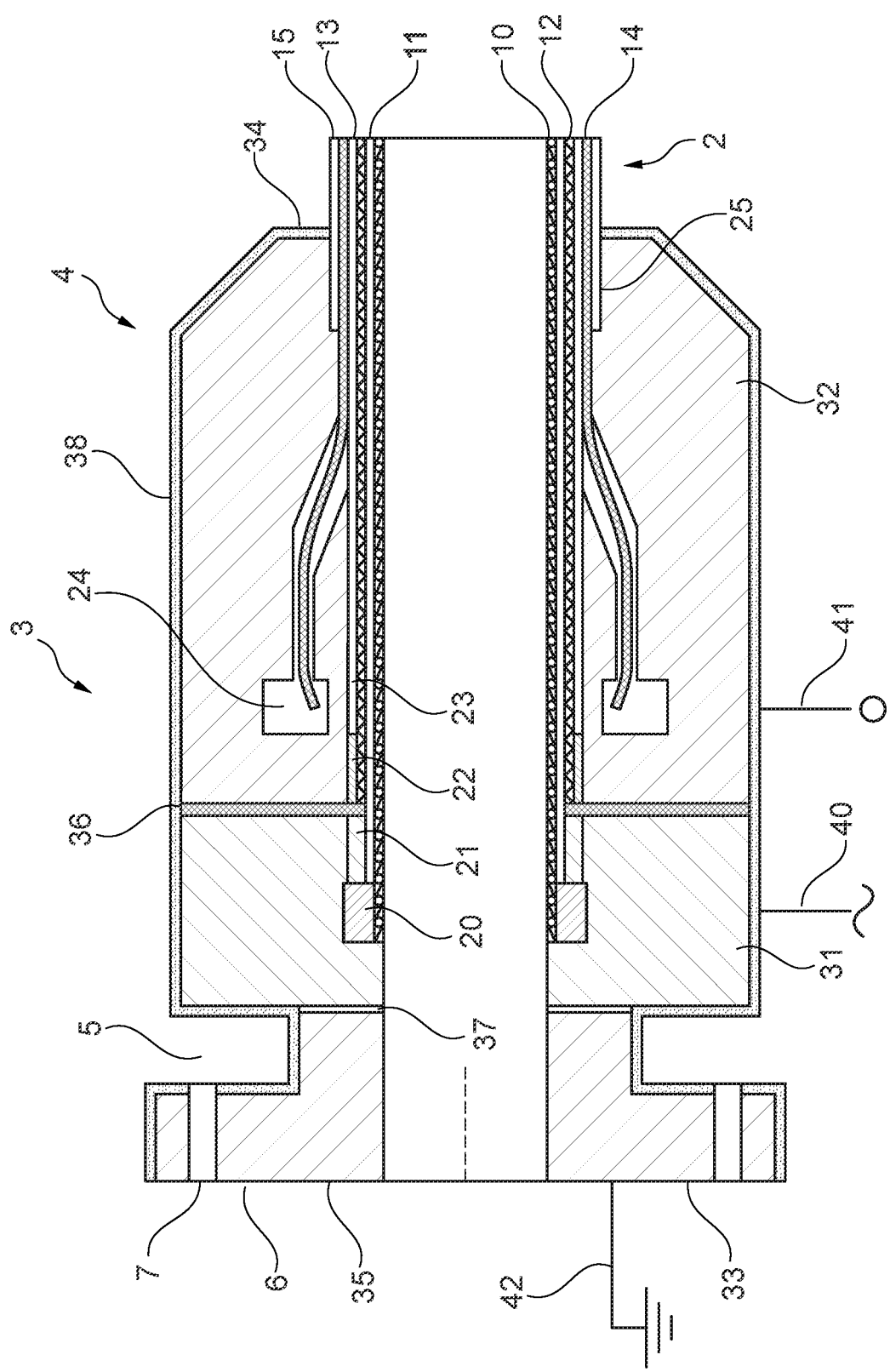
FIG. 2 shows a cross section of an embodiment of the end-fitting and an unbonded flexible according to the invention.

In FIG. 2, a cross section of an end-fitting with three electric zones and an unbonded flexible is shown.

The flexible pipe 2 enters the end-fitting 3 at the first-end 34 and is terminated in the end-fitting in a known manner. The carcass 10 is terminated with a carcass ring 20. The internal pressure sheath 11 is mechanically locked by clamps 21. The pressure armor 12 is terminated by fixation 22 and the intermediate electric insulating layer 13 is anchored in the end-fitting at 23 by mechanical interlock. The tensile armor 14 is terminated in traditional manner in a resin filled cavity 24. The outer sheath 15 is terminated at 25 and anchored by pressure means.

The internal pressure sheath 11 and the intermediate electric insulating layer 13 are made from polymer material such as polyethylene which is electrical insulating. Thus, the internal pressure sheath 11 and the intermediate electric insulating layer 13 form electrical insulating layers between the carcass 10, the pressure armor 12 and the tensile armor 14, which armor layers are all manufactured from electric conductive metallic material.

The end-fitting comprises three electric zones 31, 32 and 33. The first electric zone 31 is in this embodiment in the mid-part of the end-fitting 3 and has electric connection with the carcass 10. In this embodiment, the second electric zone 32 extends from the first electric zone 31 to the first end 34 of the end-fitting 3. The second electric zone 32 is electrical connected with the pressure armor 12 and the tensile armor 14.

The third electric zone 33 is located between the first electric zone 31 and the second end 35 of the end-fitting 3.

The first electric zone 31 is electrical separated from the second electric zone 32 by means of electrical insulating material 36 and the first electric zone 31 is electrical separated from the third electric zone 33 by means of electrical insulating material 37.

The outer surface part of the end-fitting 3 is coated with an electrical insulating coating 38 of polymer material. As indicated by lines 40 and 41, a voltage is applied to the first electric zone 31 and the second electric zone 32.

In this particular embodiment, a current may be sent from a power source through the carcass 10 and returned by the pressure armor 12 and the tensile armor 14. The three mentioned armor layers may be electrically connected in another end-fitting at a distal end of the flexible pipe 2.

To increase safety the third electric zone 33 is connected with ground via line 42.

Figure 3:
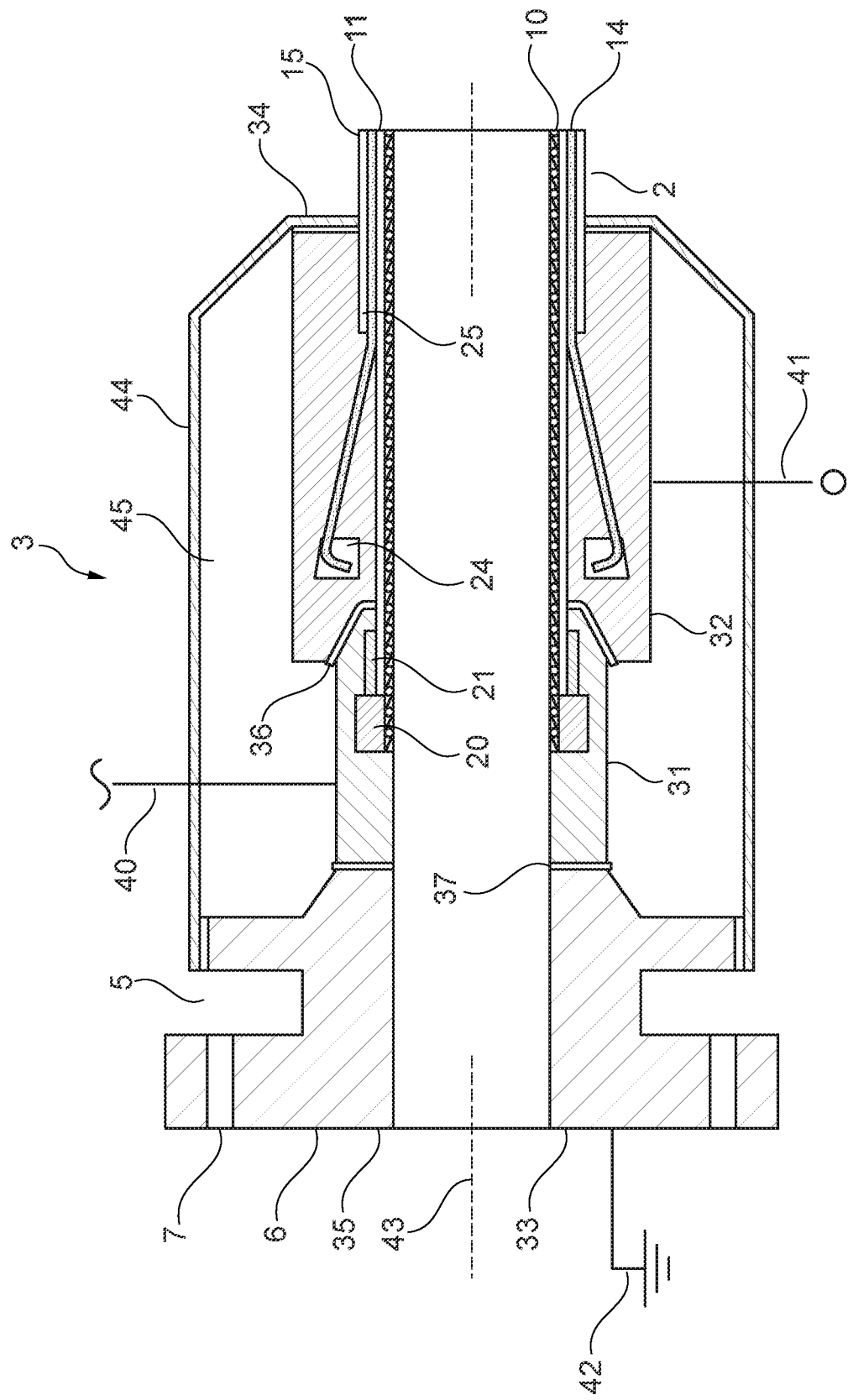
FIG. 3 shows a cross section of another embodiment of the flexible pipe 2 and the end-fitting 3 according to the invention.

FIG. 3 shows a cross section of an alternative embodiment of the flexible pipe 2 and the end-fitting 3.

The pipe 2 shown in FIG. 3 comprises a carcass 10, an internal pressure sheath 11, a tensile armor 14 and an outer sheath 15. The carcass 10 is terminated with a carcass ring 20 in a conventional manner. The internal pressure sheath 11 is terminated by clamping means 21. The tensile armor 14 is terminated in traditional manner in a resin filled cavity 24. The outer sheath 15 is terminated at 25 and anchored by pressure means.

Then an internal pressure sheath 11 forms an insulating layer between the carcass 10 and the tensile armor 14. In this embodiment, the internal pressure sheath 11 is made from an extruded layer of polyethylene which is electrical insulating. The carcass 10 and the tensile armor 14 are made from carbon steel which is electrically conductive.

The end-fitting 3 includes three different electric zones 31, 32 and 33. The first electric zone 31 is located in the mid-part of the end-fitting 3 and electrically connected with the carcass 10. The second electric zone 32 extends from the first electric zone 31 to the first end 34 of the end-fitting 3 and is electrically connected with tensile armor 14.

The third electric zone 33 is mounted at the second end 35 of the end-fitting 3. The first electric zone 31, the second electric zone 32 and the third electric zone 33 are arranged substantially concentrically in respect of the center axis indicated by dotted line 44.

The three electric zones 31, 32 and 33 are electrically separated from each other by means of electrically insulating material 36 and 37.

The end-fitting shown in FIG. 3 also comprises a cover 44 of conductive material encapsulating the first electric zone 31 and the second electric zone 32. Between the cover 44 and first electric zone 31 and the second electric zone 32 a void 45 is formed which is filled with an electrically insulating fluid.

A power supply may be connected to the first electric zone 31 and the second electric zone 32 via lines 40 and 41.

Thus, it is possible to send a current to the power source through the carcass 10 and return the current to the power source via the tensile armor 14. As the case in respect of FIG. 2, the electrically conductive armor layers may be electrically connected in another end-fitting at a distal end of the flexible pipe 2.

To reduce the hazard related to use of high voltage and current the third electric zone 33 is connected with ground via line 42.

As previously mentioned, the figures are schematic and simplified for clarity, and they show only details which are relevant in respect of the present invention. For example the end-fittings may comprise several other parts than shown in the figures, such as bolts and other connection means. Also the indicated three electric zones may each be assembled from several different parts but each still pose a single electric zone in the end-fitting.

The unbonded flexible pipe may also comprise more layers than the layers indicated in the figures. The pipe may e.g. comprise two pressure armor layers and two tensile armor layers and optionally one or more intermediate layers such as anti-wear layers and insulating layers.

What is claimed is:

1. An assembly comprising an end-fitting with a first-end and a second-end and a through-going opening having a center axis between the first-end and the second-end, and an unbonded flexible pipe comprising several layers and having a center axis along its length, said center axis of the unbonded flexible pipe being substantially coinciding with the center axis of the end-fitting for the part of the unbonded flexible pipe arranged in the end-fitting, said unbonded flexible pipe, having an end-part entering the end-fitting at the first-end and the layers of the unbonded flexible pipe being terminated in the end-fitting between the first-end and the second-end, said unbonded flexible pipe further comprises a first electrically conductive layer and a second electrically conductive layer, said first electrically conductive layer being electrically insulated from the second electrically conductive layer, and the end-fitting comprises a first electric zone electrically connected with the first electrically conductive layer, and a second electric zone electrically connected with the second electrically conductive layer, said first electric zone being electrically separated from the second electric zone, wherein the end-fitting comprises a third electric zone, said third electric zone being electrically separated from first electric zone and the second electric zone, wherein said first electric zone and said second electric zone are arranged along the length of and concentrically in respect of the center axis and at least a part of said third electric zone is located closer to the second end of the end-fitting than the first electric zone and the second electric zone, and the first electrically conductive layer and the second electrically conductive layer are connected with a source for electric power via the first electric zone and the second electric zone of the end-fitting, the applied electric power source is configured for being floating.

2. An assembly according to claim 1, wherein the first electrically conductive layer and the second electrically conductive layer of the unbonded flexible pipe are arranged substantially concentrically in respect of the center axis.

3. An assembly according to claim 1, wherein the end-fitting comprises an outer cover surrounding and being substantially co-axially with at least a part of the first electric zone and/or the second electric zone, said outer cover being of non-conductive material.

4. An assembly according to claim 1, wherein the end-fitting comprises an outer cover surrounding and being substantially co-axially with at least a part of the first electric zone and/or the second electric zone, said outer cover being of electrically conductive material and connected with ground.

5. An assembly according to claim 1, wherein the end-fitting comprises an outer cover surrounding and being substantially co-axially with at least a part of the first electric zone and/or the second electric zone, said outer cover being of electrically conductive material and connected to the third electric zone.

6. An assembly according to claim 5, wherein a void is formed between the outer cover and at least a part of the first electric zone and/or the second electric zone, said void being filled with an electrically insulating material.

7. An assembly according to claim 1, wherein the unbonded flexible pipe from the inside and outwards comprises a carcass, an internal pressure sheath, at least one pressure armor, at least one tensile armor and optionally an outer sheath.

8. An assembly according to claim 1, wherein the unbonded flexible pipe further comprises one or more intermediate layers.

9. An assembly according to claim 1, wherein the unbonded flexible pipe comprises at least one thermal insulating layer.

10. An assembly according to claim 1, wherein the first electrically conductive layer is a carcass.

11. An assembly according to claim 1, wherein the first electrically conductive layer is a pressure armor.

12. An assembly according to claim 1, wherein the second electrically conductive layer is a pressure armor.

13. An assembly according to claim 1, wherein the second electrically conductive layer is a tensile armor.

14. An assembly according to claim 1, wherein the insulation between the first electrically conductive layer and the second electrically conductive layer is constituted at least partly by the internal pressure sheath.

15. An assembly according to claim 1, wherein the applied voltage is in the range 100 V to 10 kV.

\* \* \* \* \*